(12) United States Patent
Van Spronsen et al.

(10) Patent No.: US 9,371,242 B2
(45) Date of Patent: Jun. 21, 2016

(54) TREATMENT OF AQUEOUS SOLUTIONS

(71) Applicant: TECHNISCHE UNIVERSITEIT DELFT, Delft (NL)

(72) Inventors: Jacob Van Spronsen, Delft (NL); Geert-Jan Witkamp, Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 0 days.

(21) Appl. No.: 14/349,381

(22) PCT Filed: Oct. 4, 2012

(86) PCT No.: PCT/NL2012/050693
§ 371 (c)(1),
(2) Date: Apr. 3, 2014

(87) PCT Pub. No.: WO2013/051935
PCT Pub. Date: Apr. 11, 2013

(65) Prior Publication Data
US 2014/0374361 A1    Dec. 25, 2014

(30) Foreign Application Priority Data
Oct. 4, 2011    (NL) ...................................... 2007531

(51) Int. Cl.
*B01D 9/04*     (2006.01)
*C02F 1/22*     (2006.01)
(Continued)

(52) U.S. Cl.
CPC ................ *C02F 1/22* (2013.01); *B01D 9/0013* (2013.01); *B01D 9/0036* (2013.01); *C02F 5/02* (2013.01); *C02F 1/28* (2013.01)

(58) Field of Classification Search
None
See application file for complete search history.

(56) References Cited

U.S. PATENT DOCUMENTS 4,392,959 A * 7/1983 Coillet .......................... 210/638
4,654,064 A   3/1987 Cheng
(Continued)

FOREIGN PATENT DOCUMENTS

| EP | 1094047 | 4/2001 |
|----|---------|--------|
| FR | 2217273 | 9/1974 |
| WO | 00/79095 | 12/2000 |

OTHER PUBLICATIONS

Westco Chemicals, Inc. "Barium Carbonate Material Safety Data Sheet", 2007, pp. 1-4.*
(Continued)

*Primary Examiner* — Nam Nguyen
*Assistant Examiner* — Clare Perrin
(74) *Attorney, Agent, or Firm* — Lucas & Mercanti, LLP.

(57) ABSTRACT

The invention is directed to a process for the recovery or removal of one or more crystallizable compounds from an aqueous solution containing, apart from the said crystallizable compounds, one or more organic or inorganic scale-forming or scale-inducing materials having a lower solubility in water than the said crystallizable compounds, said process comprising subjecting the said solution to at least one eutectic freeze crystallization step with recovery of ice and said one or more crystallizable compounds in crystalline form, recycling at least part of the mother liquor formed in the said eutectic crystallization step and subjecting the said recycle to a treatment with seed crystals for said scale forming or scale inducing compounds, removing at least part of the solid material obtained in said treatment step and recycle of the aqueous liquid thus obtained to the eutectic freeze crystallization step or to the feed thereto.

10 Claims, 1 Drawing Sheet

(51) Int. Cl.
    *C02F 1/52*     (2006.01)
    *C02F 5/02*     (2006.01)
    *B01D 9/00*     (2006.01)
    *C02F 1/00*     (2006.01)
    *B01D 21/00*     (2006.01)
    *B01D 21/01*     (2006.01)
    *B03D 3/00*     (2006.01)
    *C02F 1/28*     (2006.01)

(56) References Cited

U.S. PATENT DOCUMENTS

| | | | | |
|---|---|---|---|---|
| 6,478,828 | B1 * | 11/2002 | Ninane et al. | 23/301 |
| 2010/0115988 | A1 | 5/2010 | Witkamp | |
| 2011/0129409 | A1 | 6/2011 | Bakkenes | |

OTHER PUBLICATIONS

Titanium, Mineral & Chemicals "MSDS of Calcium Carbonate ($CaCO_3$)", pp. 1-9.*
Sigma-Aldrich "Calcium sulfate dihydrate Product Information", 2006, p. 1.*
ProChem, Inc. "Iron (111) Hydroxide Material Safety Data Sheet", 2007, pp. 1-3.*
AluChem Inc. "Material Safety Data Sheet Magnsium Hydroxide", 2010, pp. 1-7.*
Lewis, et al. "Design of a Eutectic Freeze Crystallization process for multicomponent waste water stream", Chemical Engineering Research and Design, 2010, 88, 1290-1296, Elsevier.*
Pronk P., et al., Prevention of Crystallization Fouling . . . , Database Compendex XP002680445.

* cited by examiner

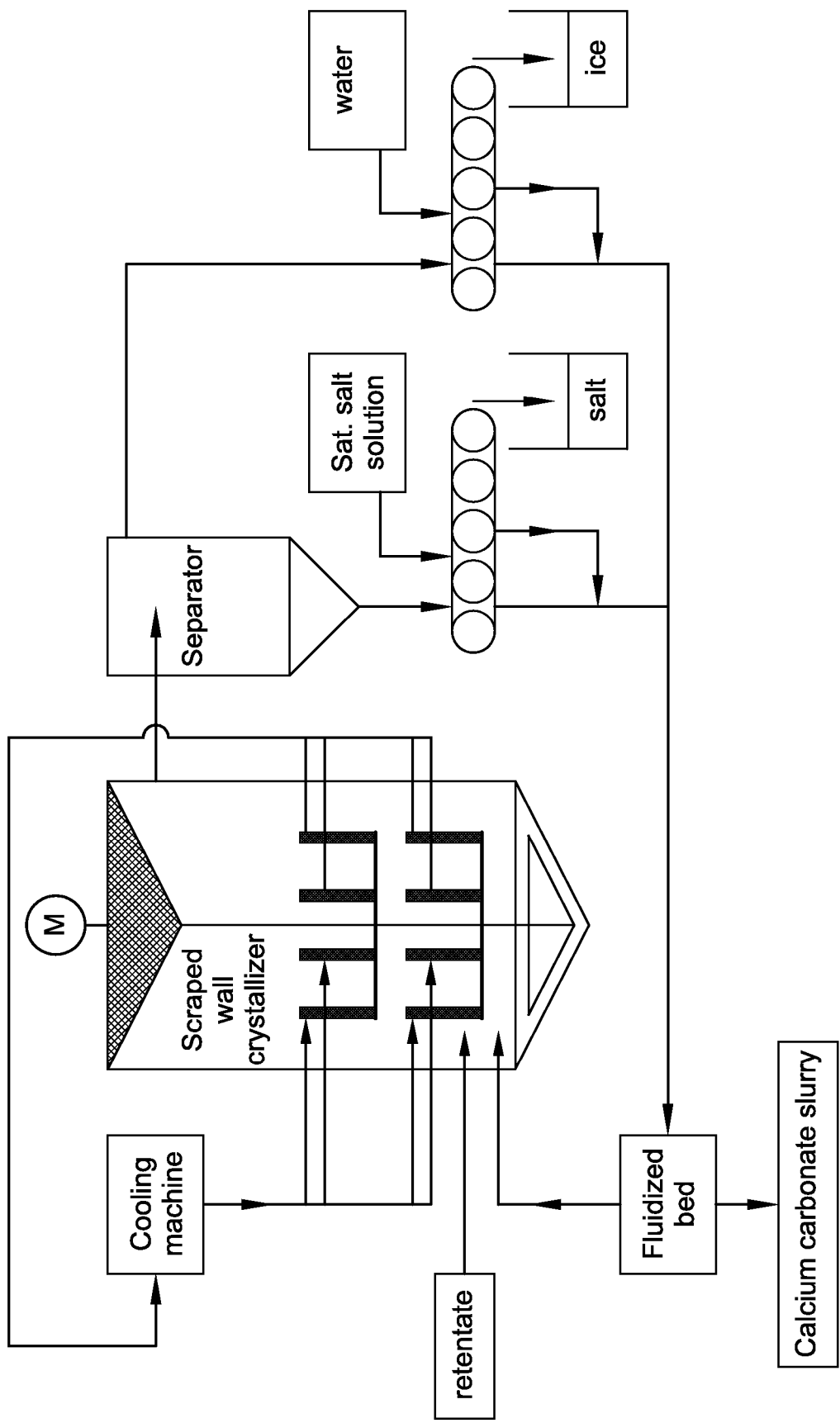

TREATMENT OF AQUEOUS SOLUTIONS

CROSS-REFERENCE TO RELATED APPLICATIONS

This application is a 371 of PCT/NL2012/050693, filed Oct. 4, 2012, which claims the benefit of Netherlands Patent Application No. 20007531, filed Oct. 4, 2011, the contents of each of which are incorporated herein by reference

FIELD OF THE INVENTION

The present invention is directed to the treatment of aqueous solutions and more in particular to a process for the recovery or removal of one or more crystallizable compounds from an aqueous solution.

BACKGROUND OF THE INVENTION

When producing, removing or recovering crystallizable compounds from aqueous solutions, often the problem of scale deposition in the equipment occurs.

Scale deposition is a phenomenon that can occur in all kinds of processes. It is an unwanted occurrence that causes a number of operational problems such as plugging of equipment, inefficient usage of chemicals, increased utility costs, lost production due to downtime, corrosion, and downgraded products from increased dirt counts.

Scale deposits that have been identified include complexes of calcium (carbonate, oxalate, sulfate, silicates), aluminum (silicates, hydroxides, phosphates), barium, such as barium sulfate, iron, such as hydroxides, and magnesium, such as sulphates or silicates.

An example of a process wherein scale deposition is a problem is the reverse osmosis of water to produce purified water. In case the water to be treated contains amounts of scale forming components, in due time the reverse osmosis membrane gets clogged by scale and becomes damaged. Accordingly, the equipment has to be taken out of production in order to remove the scale. This has a negative influence on the economics of the process.

SUMMARY OF THE INVENTION

It is an object of the present invention to provide a process for treating aqueous streams containing scale forming or scale inducing components, in which process the scale deposition is strongly reduced or even completely prevented. Also the scale forming component can be isolated separately in its pure form.

BRIEF DESCRIPTION OF THE DRAWING

FIG. 1 is a flow diagram corresponding to a process in accordance with the invention and example 1 provided herein.

DETAILED DESCRIPTION OF THE INVENTION

The present invention is based on the discovery that the use of a eutectic freeze crystallization step in the treatment of such aqueous streams, or in the recovery of crystallizable compounds from such aqueous streams makes it possible to reduce or prevent scale deposition.

The process of the present invention is accordingly directed to a process for the recovery or removal of one or more crystallizable compounds from an aqueous solution containing, apart from the said crystallizable compounds, one or more organic or inorganic scale-forming or scale-inducing materials having a lower solubility in water than the said crystallizable compounds, said process comprising subjecting the said solution to at least one eutectic freeze crystallization step with recovery of ice and said one or more crystallizable compounds in crystalline form, recycling at least part of the mother liquor formed in the said eutectic crystallization step and subjecting the said recycle to a treatment with seed crystals for said scale forming or scale inducing compounds, removing at least part of the solid material obtained in said treatment step and recycle of the aqueous liquid thus obtained to the eutectic freeze crystallization step or to the feed thereto.

In the present invention the scale forming or inducing components are efficiently removed from the system by treatment of the mother liquor in a suitable way, thereby keeping the concentration of the said components below the level at which they precipitate in the system.

The scale-forming or scale-inducing compounds are in the broadest sense defined as organic or inorganic compounds that have a lower solubility in water than the said crystallizable compound. More in particular, the said scale-forming or scale-inducing compounds are sparingly soluble, i.e. have a solubility below 6.5 wt. %, more in particular below 1 wt. %. In general, the said crystallizable compounds have a solubility in water of more than 10 wt. %.

The scale-forming or scale-inducing compounds are generally inorganic salts, acids or bases, such as salts, oxides and hydroxides of calcium, barium, magnesium, aluminum and iron. More in particular the said compounds are phosphates, sulfates, silicates, oxides and hydroxides of calcium, barium, magnesium, aluminum and iron. It is also possible that the salt is a mixed salt, such as magnesium-ammonium sulfate.

The one or more crystallizable compounds to be recovered or removed from the aqueous solution can be almost any compound, crystallizable from water. Preferably the said compounds are organic or inorganic salts, acids or bases, such as sodium chloride, nitric acid, soda, magnesium sulfate, sodium sulfate, acetic acid, sodium bicarbonate and barium chloride.

It is also possible that both the crystallizable compound and the scale-forming or scale-inducing compound are of commercial value and will be recovered. An example is the production of soda and sodium bicarbonate from a mixture thereof, wherein during the eutectic freeze crystallization the soda is recovered and the sodium bicarbonate is recovered from the mother liquor recycle stream.

The invention is based on the surprising discovery that in a eutectic freeze crystallization system the second component, i.e. the so-called scale-forming or scale-inducing compound, is present in the crystallizer, in a super-saturated, meta stable condition. Due to the specific characteristics of a eutectic freeze crystallization system, said compound does not precipitate in the crystallizer, but only in the treatment step with seed crystals in a separate step.

In a preferred embodiment, the scale forming components are precipitated using a fluidized bed of seed material (crystals). However, other unit operations for precipitating the said components may also be used, such as a stirred tank crystallizer or a forced circulation crystallizer.

The nature of the seed crystals will depend on the components to be removed and will, in general, be the same as the component to be removed. However, it is also possible to use other seed crystals, provided they provide an efficient seeding for the precipitation.

The precipitate produced is removed from the mother liquor, which is recycled. The precipitate may be discarded, or in case it is of sufficient commercial value, used as such, optionally after subsequent treatment.

In case other contaminants are present in the system that tend to accumulate in the mother liquor recycle, a small bleed stream may be needed, to keep the level of those other contaminants at an acceptable level.

The process of the invention may be used in various configurations. In a first embodiment, the aim is to remove salts and/or other contaminating compounds from water, for example in the production of pure water from seawater or ground water. In a further embodiment, the dissolved component(s) may be the intended product of the process, water or ice being the less important product. In a third embodiment, the process of the invention may be used to process a side stream from another process, such as reverse osmosis, to overcome problems that are inherent to said other process.

An important embodiment of the invention is in the production of pure water from ground water or seawater by reverse osmosis (RO). RO processes are limited by the scale formation in the system, as the concentration of the scale forming compounds increases in the recycle over the membrane, resulting in an increase in membrane pressure. By treating the retentate of the RO membrane in a process according to the invention, the problem of membrane pressure increase and scale formation is substantially prevented. The retentate is namely processed in an EFC into three streams, namely pure ice, a salt stream (usually sodium chloride, optionally in combination with other salts, or as separate salt product) and a mother liquor containing the scale forming or inducing components.

Other possible sources of aqueous solutions to be treated in the process of the invention are waste water streams from paper making, mining industry or oil and/or gas production.

The present invention is i.a. based on the use of a eutectic freeze crystallization step. This is a well-known process, for example described in US patent specification U.S. Pat. No. 7,127,913, the contents of which is incorporated herein by way of reference.

Eutectic freeze crystallisation is a process based on separation of components at a eutectic freezing point. Eutectic freeze crystallisation has been described in EP-A 1,230,194 and in Chem. Eng. Proc. 37, (1998), pp 207-213.

In freeze crystallisation at a eutectic freezing point (Eutectic freeze crystallisation; EFC) on the one hand crystalline material is obtained, and on the other hand ice crystals.

As has been described in the cited references, EFC is based on the principle that a solution of a salt in water exhibits a eutectic freezing point. In the phase diagram water-salt, it can be seen that in case an undersaturated water salt mixture is cooled down to the freezing point thereof, ice crystals form first. This increases the salt concentration in the solution and decreases the temperature along the freezing point depression line, until the solution is saturated. At this composition the eutectic freezing point is reached. Further heat withdrawal results in simultaneous formation of both ice crystals and crystals of salt. In case the solution becomes (or is) saturated, first the salt will crystallise and the temperature will decrease along the solubility line, until an eutectic freezing point is reached. Then simultaneous formation of both ice crystals and crystals of salt occurs again at or near the eutectic point of the specific combination of compounds. In continuous operation, the operation point will therefore lie close to the eutectic point, irrespective of the feed composition.

Due to the difference in density and/or particle size, the crystals of salt and the ice can be recovered separately.

The invention is now described in the following FIGURE and non-limiting example.

EXAMPLE 1

In the FIGURE a process for the recovery of sodium chloride from saline groundwater containing calcium carbonate is described.

Saline groundwater was concentrated by reverse osmosis. The retentate consisted of a solution containing 1% of sodium chloride and 200 ppm of calcium carbonate. In a continuous process the retentate was fed at 200 liter/hour into a cooling scraped wall crystallizer with a volume of 200 liter. Inside the crystallizer, ice and sodium chloride as a dihydrate crystallized at the surface of the heat exchangers at −23 C. The crystals were removed from the heat exchanger surface by scraping. From the crystallizer a slurry containing sodium chloride and ice crystals was transferred into a separator with a volume of 150 liter. Over the top of the separator ice slurry was removed with a flow rate of 140 liter/hour and filtered over a belt filter. The ice was washed with 20% water and molten down to yield pure water. The mother liquor from the belt filter was fed into a floating bed crystallizer containing calcium carbonate. The supernatant of the floating bed crystallizer was recycled into the scraped wall crystallizer. From the bottom of the separator sodium chloride crystal slurry was removed with a flow rate of 60 liter/hour and filtered over a belt filter. The sodium chloride crystals were washed with 1 cake volume of saturated sodium chloride solution yielding pure sodium chloride. The mother liquor of the belt filter was fed into the floating bed crystallizer. From the floating bed crystallizer a small stream of calcium carbonate was obtained.

The invention claimed is:

1. Process for the recovery or removal of one or more crystallizable compounds from an aqueous solution containing, apart from the said crystallizable compounds, one or more organic or inorganic scale-forming or scale-inducing materials having a lower solubility in water than the said crystallizable compounds, wherein the said scale-forming or scale-inducing material is selected from the group of salts, oxides and hydroxides of calcium, barium, magnesium, aluminum, and iron, said process comprising:
   subjecting the said aqueous solution to a reverse osmosis step and the retentate thereof is subjected to at least one eutectic freeze crystallization step with recovery of ice and said one or more crystallizable compounds in crystalline form, wherein the said scale-forming or scale-inducing materials are present in the said eutectic freeze crystallization step in a supersaturated, meta stable condition, wherein said at least one eutectic freeze crystallization step results in three streams, an ice stream, a salt stream including the one or more crystallizable compounds, and a mother liquor including the scale-forming or scale-inducing materials;
   subjecting at least part of the mother liquor to a treatment with seed crystals for said scale-forming or scale-inducing materials thereby inducing precipitation of said scale-forming or scale-inducing materials, forming a treated mother liquor;
   removing at least part of the precipitated solid material obtained with said seed crystals from said treated mother liquor; and subsequently
   recycling said treated mother liquor to the at least one eutectic freeze crystallization step or to the feed thereto.

2. Process according to claim 1, wherein the part of the mother liquor is treated in a fluidized bed of seed crystals.

3. Process according to claim 1, wherein the part of the mother liquor, after treatment with the seed crystals, is recycled to the feed to the reverse osmosis step.

4. Process according to claim 1, wherein the aqueous solution is a waste water stream from paper making, the mining industry, or oil production, or gas production.

5. Process according to claim 1, wherein the aqueous solution is a feed stream to produce water from seawater and the ice produced is further processed to produce potable water.

6. Process according to claim 1, wherein the solubility in water of the said scale-forming or scale-inducing material is lower than 6.5 wt. %.

7. Process according to claim 1, wherein said crystallizable compound is selected from the group consisting of inorganic salts, acids and bases.

8. Process according to claim 7, wherein the said crystallizable compound is selected from the group consisting of sodium chloride, nitric acid, soda, magnesium sulfate, sodium sulfate, acetic acid, sodium bicarbonate, and barium chloride.

9. Process according to claim 1, wherein the salt is selected from the group consisting of phosphates, sulfates and silicates.

10. Process according to claim 6, wherein the solubility in water of the said scale-forming or scale-inducing material is lower than 1 wt. %.

\* \* \* \* \*